United States Patent
Yamada et al.

(10) Patent No.: US 10,523,289 B2
(45) Date of Patent: Dec. 31, 2019

(54) BASE STATION DEVICE, TERMINAL DEVICE, AND COMMUNICATION METHOD

(71) Applicant: SHARP KABUSHIKI KAISHA, Sakai, Osaka (JP)

(72) Inventors: Ryota Yamada, Sakai (JP); Jungo Goto, Sakai (JP); Osamu Nakamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/762,473

(22) PCT Filed: Aug. 26, 2016

(86) PCT No.: PCT/JP2016/074929
§ 371 (c)(1),
(2) Date: Mar. 22, 2018

(87) PCT Pub. No.: WO2017/051659
PCT Pub. Date: Mar. 30, 2017

(65) Prior Publication Data
US 2018/0262238 A1    Sep. 13, 2018

(30) Foreign Application Priority Data

Sep. 25, 2015  (JP) .................................. 2015-187658

(51) Int. Cl.
*H04B 7/0452* (2017.01)
*H04W 24/10* (2009.01)
(Continued)

(52) U.S. Cl.
CPC ........ *H04B 7/0452* (2013.01); *H04J 11/0073* (2013.01); *H04J 11/0076* (2013.01);
(Continued)

(58) Field of Classification Search
CPC ... H04W 72/042; H04W 72/04; H04W 16/28; H04W 24/10; H04B 7/0426;
(Continued)

(56) References Cited

U.S. PATENT DOCUMENTS

2011/0105165 A1* 5/2011 Sagfors ................. H04W 48/12
                                                            455/507
2016/0065401 A1* 3/2016 Jia ............................ H04L 5/02
                                                            375/298
(Continued)

FOREIGN PATENT DOCUMENTS

JP    2015-136031 A   7/2015
WO    2015/141689 A1  9/2015
WO    2016/129424 A1  8/2016

OTHER PUBLICATIONS

MediaTek Inc., New SI Proposal: Study on Downlink Multiuser SuperpositionTransmission for LTE, RP-150496, 3GPP TSG RAN Meeting #67, Shanghai, China, Mar. 9-12, 2015.
(Continued)

*Primary Examiner* — Sophia Vlahos
(74) *Attorney, Agent, or Firm* — ScienBiziP, P.C.

(57) ABSTRACT

The present invention provides a base station device, a terminal device, and a communication method, where the terminal efficiently learns information of an interference signal and reduces interference in a reception process to make it possible to enhance throughput, enhance communication opportunity of each terminal device by feedback from the terminal, and the like. The base station device includes a transmission unit configured to transmit, to the terminal device, Multiuser Superposition Transmission (MUST) information used for canceling interference due to MUST. The MUST information includes multiple combinations of modulation schemes for the MUST, and a list of power ratios used for the MUST in each of the combinations of the modulation schemes.

10 Claims, 6 Drawing Sheets

(51) Int. Cl.
*H04J 11/00* (2006.01)
*H04L 5/00* (2006.01)
*H04W 72/04* (2009.01)

(52) U.S. Cl.
CPC ............ *H04L 5/005* (2013.01); *H04W 24/10* (2013.01); *H04W 72/042* (2013.01)

(58) Field of Classification Search
CPC . H04B 7/0452; H04J 11/0073; H04J 11/0076; H04L 5/005
See application file for complete search history.

(56) References Cited

U.S. PATENT DOCUMENTS

| | | | |
|---|---|---|---|
| 2016/0073382 A1* | 3/2016 | Li ..................... | H04W 72/1289 370/329 |
| 2016/0142193 A1* | 5/2016 | Benjebbour ......... | H04J 11/0043 370/329 |
| 2016/0330695 A1 | 11/2016 | Benjebbour et al. | |
| 2017/0048841 A1* | 2/2017 | Hwang ................. | H04L 5/0044 |
| 2017/0071005 A1 | 3/2017 | Kato et al. | |
| 2018/0027441 A1* | 1/2018 | Kim ..................... | H04B 7/0452 370/311 |
| 2018/0035386 A1 | 2/2018 | Yamada et al. | |
| 2018/0063819 A1* | 3/2018 | Saito ........................ | H04B 7/04 |
| 2018/0069651 A1* | 3/2018 | Davydov .............. | H04L 5/0001 |
| 2018/0109299 A1* | 4/2018 | Benjebbour ............. | H04B 7/04 |
| 2018/0124708 A1* | 5/2018 | Davydov ............ | H04W 52/143 |
| 2018/0191549 A1* | 7/2018 | Schober .............. | H04L 27/3488 |
| 2018/0262288 A1* | 9/2018 | Gao ........................... | H04J 7/00 |

OTHER PUBLICATIONS

ITL, "High Level Signalling of NOMA for Multiuser Superposition Transmission", R1-154547, 3GPP TSG RAN WG1 Meeting #82, Beijing, China, Aug. 24-28, 2015.

\* cited by examiner

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

FIG. 2

| Value | One Codeword:<br>Codeword 0 enabled,<br>Codeword 1 disabled<br>Message | Value | Two Codewords:<br>Codeword 0 enabled,<br>Codeword 1 enabled<br>Message |
|---|---|---|---|
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 2 layers, ports 11, 13, $n_{SCID}=0$ |
| 3 | 1 layer, port 8, $n_{SCID}=1$ | 3 | 2 layers, ports 11, 13, $n_{SCID}=1$ |
| 4 | 1 layers, ports 11, $n_{SCID}=0$ | 4 | Reserved |
| 5 | 1 layers, ports 11, $n_{SCID}=1$ | 5 | Reserved |
| 6 | 1 layers, ports 13, $n_{SCID}=0$ | 6 | Reserved |
| 7 | 1 layers, ports 13, $n_{SCID}=1$ | 7 | Reserved |

FIG. 3

| Value | One Codeword:<br>Codeword 0 enabled,<br>Codeword 1 disabled<br>Message | Value | Two Codewords:<br>Codeword 0 enabled,<br>Codeword 1 enabled<br>Message |
|---|---|---|---|
| 0 | 1 layer, port 7 | 0 | 2 layers, ports 7-8 |
| 1 | 1 layer, port 8 | 1 | 2 layers, ports 11, 13 |
| 2 | 1 layer, port 11 | 2 | 3 layers, ports 7-9 |
| 3 | 1 layer, port 13 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

FIG. 4

BASE STATION DEVICE, TERMINAL DEVICE, AND COMMUNICATION METHOD

TECHNICAL FIELD

The present invention relates to a base station device, a terminal device, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which areas covered by base station devices (base stations, transmission stations, transmission points, downlink transmission devices, uplink reception devices, a group of transmit antennas, a group of transmit antenna ports, component carriers, eNodeB) or transmission stations equivalent to the base station devices are arranged in the form of multiple cells (Cells) being linked together. In such a cellular configuration, frequency efficiency can be improved by using the same frequency among neighboring cells or sectors.

To increase system capacity, enhance communication opportunity, and the like, a technique in which multiple terminal devices are non-orthogonally multiplexed to perform transmission, multi-user transmission based on superposition coding, and the like are studied in these years. Inter-user interference is caused because multiple terminal devices are non-orthogonally multiplexed to perform transmission by a base station device. Therefore, the terminal device needs to remove or prevent inter-user interference from being caused. The above point is described in NPL 1. As a technique to cancel the inter-user interference, an interference canceler for canceling an interference signal, Maximum Likelihood Detection, or the like can be cited, for example.

CITATION LIST

NPL 1: "Study on Downlink Multiuser Superposition Transmission for LTE", 3GPP TSG RAN Meeting #67, March 2015.

DISCLOSURE OF THE INVENTION

Problems to be Solved by the Invention

However, in order for the terminal device to remove or prevent the inter-user interference, the terminal device needs to learn information of an interference signal, such as parameters for demodulation/decoding of the interference signal. Furthermore, in order for the terminal device to remove or prevent the inter-user interference, the base station needs to adequately determine the terminal to be non-orthogonally multiplexed. Because of this, the terminal needs to report channel information to the base station.

The present invention has been made in consideration of the above circumstances, and an object of the invention is to provide a base station device, a terminal device, and a communication method, where the terminal efficiently learns information of an interference signal and reduces interference in a reception process to make it possible to enhance throughput, enhance communication opportunity of each terminal device by feedback from the terminal, and the like.

Means for Solving the Problems

To address the above-mentioned drawbacks, a base station device, a terminal device, and a communication method according to an aspect of the present invention are configured as follows.

A base station device according to an aspect of the present invention is a base station device that is configured to communicate with a terminal device and includes a transmission unit configured to transmit, to the terminal device, Multiuser Superposition Transmission (MUST) information used for canceling interference due to MUST, and the MUST information includes a plurality of combinations of modulation schemes for the MUST, and a list of power ratios used for the MUST in each of the plurality of combinations of the modulation schemes.

In the base station device according to an aspect of the present invention, in the plurality of combinations of the modulation schemes, the number of candidates included in the list of the power ratios in at least one the plurality of combinations of the modulation schemes is different from the number of candidates included in the list of the power ratios in another one of the plurality of combinations of the modulation schemes.

In the base station device according to an aspect of the present invention, in the plurality of combinations of the modulation schemes, the number of candidates for the power ratios in each of the plurality of combinations of the modulation schemes is one, and a value of a power ratio in a combination of modulation schemes of another type is different.

In the base station device according to an aspect of the present invention, in the plurality of combinations of the modulation schemes, a range of a value included in the list of power ratios in at least one of the plurality of combinations of the modulation schemes is different from a range of a value included in a list of power ratios in a combination of modulation schemes of another type.

In the base station device according to an aspect of the present invention, in the plurality of combinations of the modulation schemes, granularity of a value included in the list of power ratios in at least one of the plurality of combinations of the modulation schemes is different from granularity of a value included in a list of power ratios in a combination of modulation schemes of another type.

In the base station device according to an aspect of the present invention, the transmission unit transmits, to the terminal device, information indicating a candidate for the power ratios and information indicating an interference modulation scheme.

In the base station device according to an aspect of the present invention, the transmission unit further transmits information indicating an interference modulation scheme, and in transmitting the MUST information to the terminal device without using the MUST, the transmission unit transmits, to the terminal device, information indicating the modulation scheme for the interference to include a combination of the modulation schemes that are not included in the MUST information.

A terminal device according to an aspect of the present invention is a terminal device that is configured to communicate with a base station device and includes a reception unit configured to receive, from the base station device, Multiuser Superposition Transmission (MUST) information used for canceling interference due to MUST, and the MUST information includes a plurality of combinations of modulation schemes for the MUST, and a list of power ratios used for the MUST in each of the plurality of combinations of the modulation schemes.

In the terminal device according to an aspect of the present invention, in the plurality of combinations of the modulation schemes, the number of candidates included in the list of power ratios in at least one of the plurality of combinations of the modulation schemes is different from the number of candidates included in the list of power ratios in another one of the plurality of combinations of the modulation schemes.

In the terminal device according to an aspect of the present invention, in the plurality of combinations of the modulation schemes, the number of candidates for the power ratios in each of the plurality of combinations of the modulation schemes is one, and a value of a power ratio in a combination of modulation schemes of another type is different.

In the terminal device according to an aspect of the present invention, in the plurality of combinations of the modulation schemes, a range of a value included in the list of the power ratios in at least one of the plurality of combinations of the modulation schemes is different from a range of a value included in a list of power ratios in a combination of modulation schemes of another type.

In the terminal device according to an aspect of the present invention, in the plurality of combinations of the modulation schemes, granularity of a value included in the list of the power ratios in at least one of the plurality of combinations of the modulation schemes is different from granularity of a value included in a list of power ratios in a combination of modulation schemes of another type.

In the terminal device according to an aspect of the present invention, the reception unit receives, into the terminal device, information indicating a candidate for the power ratios and information indicating an interference modulation scheme, and determines a power ratio included in the MUST information from a modulation scheme of the terminal device, the information indicating the interference modulation scheme, and one of candidates for the power ratios.

In the terminal device according to an aspect of the present invention, the reception unit further receives information indicating an interference modulation scheme, and in a case that a combination of the modulation scheme of the terminal device and a modulation scheme obtained from the information indicating the interference modulation scheme is a combination of modulation schemes that are not included in the MUST information, the reception unit determines that MUST is not used and carries out a reception process.

A communication method according to an aspect of the present invention is a communication method in a base station device configured to communicate with a terminal device, the method including the step of transmitting, to the terminal device, Multi-user Superposition Transmission (MUST) information used for canceling interference due to MUST, and the MUST information includes a plurality of combinations of modulation schemes for the MUST, and a list of power ratios used for the MUST in each of the plurality of combinations of the modulation schemes.

A communication method according to an aspect of the present invention is a communication method in a terminal device configured to communicate with a base station device, the method including the step of receiving, from the base station device, Multiuser Superposition Transmission (MUST) information used for canceling interference due to MUST, and the MUST information includes a plurality of combinations of modulation schemes for the MUST, and a list of power ratios used for the MUST in each of the plurality of combinations of the modulation schemes.

Effects of the Invention

According to some aspects of the present invention, the interference signals are reduced, and the throughput, the communication opportunity of the terminal device, and the like are enhanced.

BRIEF DESCRIPTION OF THE DRAWINGS

FIG. 2 is a table illustrating an example of an antenna port, a scrambling identity, and the number of layers according to the present embodiment.

FIG. 3 is a table illustrating an example of an antenna port, a scrambling identity, and the number of layers according to the present embodiment, FIG. 4 is a table illustrating an example of an antenna port, a scrambling identity, and the number of layers according to the present embodiment.

MODE FOR CARRYING OUT THE INVENTION

A communication system according to the present embodiment includes a base station device (a transmission unit, cells, serving cells, a transmission point, a group of transmit antennas, a group of transmit antenna ports, component carriers, eNodeB) and terminal devices (a terminal, a mobile terminal, a reception point, a reception terminal, a reception unit, a group of receive antennas, a group of receive antenna ports, UE).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
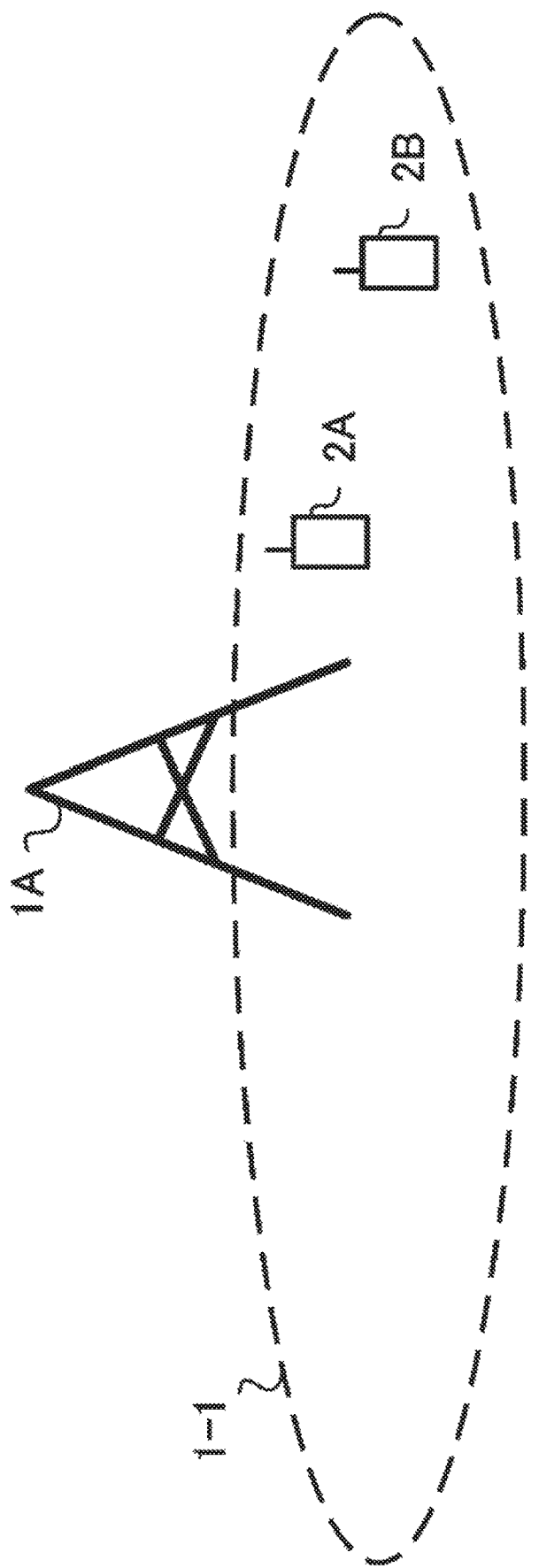
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station device 1A and terminal devices 2A and 2B. Coverage 1-1 is a range (a communication area) in which the base station device 1A can connect to the terminal devices. The terminal devices 2A and 2B are also collectively referred to as terminal devices 2.

With respect to FIG. 1, the following uplink physical channels are used for uplink radio communication from the terminal device 2A to the base station device 1A. The uplink physical channels are used for transmission of information output from higher layers.

Physical Uplink Control CHannel (PUCCH)
Physical Uplink Shared CHannel (PUSCH)
Physical Random Access CHannel (PRACH)

PUCCH is used for transmission of Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared CHannel (DL-SCH)). ACK/NACK for the downlink data is also referred to as HARQ-ACK or HARQ feedback.

Here, the Uplink Control Information includes Channel State Information (CSI) for the downlink. The Uplink Control information includes a Scheduling Request (SR) used to request an Uplink-Shared CHannel (UL-SCH) resource. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, and the like.

The Channel Quality Indicator (hereinafter, referred to as a CQI value) can be a suited modulation scheme (e.g., QPSK, 16QAM, 64QAM, 256QAM, or the like) and a suited coding rate in a predetermined band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be an index determined by the number of spatial multiplexing, Precoding Matrix information, or the like. Note that values of the Rank indicator, the Precoding Matrix Indicator, and the Channel Quality Indicator are collectively referred to as CSI values.

PUSCH is used for transmission of uplink data (an uplink transport block, UL-SCH). Furthermore, PUSCH may be used for transmission of ACK/NACK and/or Channel State information along with the uplink data. In addition, PUSCH may be used to transmit the Uplink Control Information only.

PUSCH is used to transmit an RRC message. The RRC message is a signal/information that is processed in a Radio Resource Control (RRC) layer. Further, PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

PRACH is used to transmit a random access preamble.

In the uplink radio communication, an UpLink Reference Signal (UL RS) is used as an uplink physical signal. The uplink physical signal is not used for transmission of information output from higher layers, but is used by the physical layer. The Uplink Reference Signal includes a DeModulation Reference Signal (DMRS) and a Sounding Reference Signal (SRS).

DMRS is associated with transmission of PUSCH or PUCCH. For example, the base station device 1A uses DMRS in order to perform channel compensation of PUSCH or PUCCH. SRS is not associated with the transmission of PUSCH or PUCCH. For example, the base station device 1A uses SRS to measure an uplink channel state.

In FIG. 1, the following downlink physical channels are used for the downlink radio communication from the base station device 1A to the terminal device 2A. The downlink physical channels are used for transmission of information output from higher layers.

Physical Broadcast CHannel (PBCH)
Physical Control Format Indicator CHannel (PCFICH)
Physical Hybrid automatic repeat request indicator CHannel (PHICH)
Physical Downlink Control CHannel (PDCCH)
Enhanced Physical Downlink Control CHannel (EPDCCH)
Physical Downlink Shared CHannel (PDSCH)

PBCH is used for broadcasting a Master Information Block (MIB, a Broadcast CHannel (BCH)) that is shared by the terminal devices. PCFICH is used for transmission of information indicating a region (e.g., the number of OFDM symbols) to be used for transmission of PDCCH.

PHICH is used for transmission of ACK/NACK with respect to uplink data (a transport block, a codeword) received by the base station device 1A. In other words, PHICH is used for transmission of a HARQ indicator (HARQ feedback) indicating ACK/NACK with respect to the uplink data. Note that ACK/NACK is also called HARQ-ACK. The terminal device 2A reports ACK/NACK having been received to a higher layer. ACK/NACK refers to ACK indicating a successful reception, NACK indicating an unsuccessful reception, and DTX indicating that no corresponding data is present. In a case that PHICH for uplink data is not present, the terminal device 2A reports ACK to a higher layer.

PDCCH and EPDCCH are used for transmission of Downlink Control Information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, a TPC command for PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, a TPC command for PUSCH, and the like. Here, the DCI format for the uplink is also referred to as uplink grant (or uplink assignment).

Further, the DCI format for the uplink can be used to request downlink Channel State information (CSI), which is also called reception quality information. The Channel State Information refers to the Rank Indicator (RI) specifying a suited number of spatial multiplexing, the Precoding Matrix Indicator (PMI) specifying a suited precoder, the Channel Quality Indicator (CQI) specifying a suited transmission rate, Precoding Type Indicator (PTI) and the like.

The DCI format for the uplink can be used for a configuration indicating an uplink resource to which a CSI feedback report is mapped, the CSI feedback report being fed back to the base station device by the terminal device. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

For example, the CSI feedback report can be used for a configuration indicating an uplink resource to report aperiodic Channel State Information (aperiodic CSI). The CSI feedback report can be used for a mode configuration (CSI report mode) to aperiodically report the Channel State Information. The base station device can configure any one of the periodic CSI feedback report and the aperiodic CSI feedback report. In addition, the base station device can configure both the periodic CSI feedback report and the aperiodic CSI feedback report.

The DCI format for the uplink can be used for a configuration indicating a type of the CSI feedback report that is fed back to the base station device by the terminal device. The type of the CSI feedback report includes wideband CSI (e.g., Wideband CQI), narrowband CSI (e.g., Subband CQI), and the like.

In a case where a PDSCH resource is scheduled in accordance with the downlink assignment, the terminal device receives downlink data on the scheduled PDSCH. In a case where a PUSCH resource is scheduled in accordance with the uplink grant, the terminal device transmits uplink data and/or uplink control information of the scheduled PUSCH.

PDSCH is used for transmission of downlink data (a downlink transport block, DL-SCH). PDSCH is used to transmit a system information block type 1 message. The system information block type 1 message is cell-specific information.

PDSCH is used to transmit a system information message. The system information message includes a system information block X other than the system information block type 1. The system information message is cell-specific information.

PDSCH is used to transmit an RRC message. Here, the RRC message transmitted from the base station device may be shared by multiple terminal devices in a cell. Further, the RRC message transmitted from the base station device 1A may be a dedicated message to a given terminal device 2 (also referred to as dedicated signaling). In other words, user-equipment-specific information (unique to user equipment) is transmitted using a message dedicated to the given terminal device. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CST feedback report being fed back to the base station device by the terminal device. For example, the CSI feedback report can be used for a configuration indicating an uplink resource for periodically reporting Channel State Information (periodic CSI). The CSI feedback report can be used for a mode configuration (CSI report mode) to periodically report the Channel State Information.

The type of the downlink CSI feedback report includes wideband CSI (e.g., Wideband CSI) and narrowband CSI (e.g., Subband CSI). The wideband CSI calculates one piece of Channel State Information for the system band of a cell. The narrowband CSI divides the system band in predetermined units, and calculates one piece of Channel State Information for each division.

In the downlink radio communication, a Synchronization signal (SS) and a DownLink Reference Signal (DL RS) are used as downlink physical signals. The downlink physical signals are not used for transmission of information output from the higher layers, but are used by the physical layer.

The Synchronization signal is used for the terminal device to be synchronized to frequency and time domains in the downlink. The Downlink Reference Signal is used for the terminal device to perform channel compensation on a downlink physical channel. For example, the Downlink Reference Signal is used for the terminal device to calculate the downlink Channel State Information.

Here, the Downlink Reference Signals include a Cell-specific Reference Signal (CRS), a UE-specific Reference Signal (URS) or a terminal device-specific reference signal relating to PDSCH, a DeModulation Reference Signal (DMRS) relating to EPDCCH, a Non-Zero Power Chanel State Information—Reference Signal (NZP CSI-RS), and a Zero Power Chanel State Information—Reference Signal (ZP CSI-RS).

CRS is transmitted in all bands of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station device 1A. The terminal device 2A performs signal measurement (channel measurement), using NZP CSI-RS. A resource for ZP CSI-RS is configured by the base station device 1A. With zero output, the base station device 1A transmits ZP CSI-RS. The terminal device 2A performs interference measurement in a resource to which NZP CSI-RS corresponds, for example.

A Multimedia Broadcast multicast service Single Frequency Network (MBSFN) RS is transmitted in all bands of the subframe used for transmitting PMCH. MBSFN RS is used to demodulate PMCH. PMCH is transmitted on the antenna port used for transmission of MBSFN RS.

Here, the downlink physical channel and the downlink physical signal are also collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword and subject to coding processing or the like on a codeword basis.

The base station device can multiplex multiple terminal devices without dividing a resource by time, frequency, and space an antenna port, a beam pattern, a preceding pattern). Hereinafter, multiplexing multiple terminal devices without dividing a resource by time/frequency/space is also referred to as non-orthogonal multiplexing, Multiuser Superposition Transmission (MUST). Although a case in which two terminal devices are non-orthogonally multiplexed is described below, an aspect of the present invention is not limited thereto, and three or more terminal devices can also be non-orthogonally multiplexed.

The base station device can transmit a shared terminal device-specific reference signal to multiple terminal devices to be non-orthogonally multiplexed. In other words, the base station device can transmit a reference signal, to the multiple terminal devices, using the same resource in terms of time/frequency/space and the same reference signal sequence. The base station device can perform transmission by MUST in a case of a prescribed transmission mode. Further, it is possible for the base station device not to perform transmission by MUST in a case of another prescribed transmission mode. To rephrase, the terminal device can determine whether the transmission is performed by MUST in accordance with the configured transmission mode.

A case in which the base station device 1A in FIG. 1 non-orthogonally multiplexes the terminal device 2A and the terminal device 2B will be taken as an example and described below. Unless otherwise noted, it is assumed that the terminal device 2A is closer to the base station device 1A than the terminal device 2B, or that the reception quality of the terminal device 2A is better than that of the terminal device 2B. Further, in the following description, PDSCH with respect to the terminal device 2A is also referred to as PDSCH1 (first PDSCH), and PDSCH (second PDSCH) with respect to the terminal device 2B.

In the case where the base station device 1A non-orthogonally multiplexes the terminal devices 2A and 2B and performs transmission, several transmission methods can be used. For example, the base station device 1A can perform superposition transmission for the terminal devices 2A and 2B using a mapping of QPSK/16QAM/64QAM/256QAM of the same constellation. In this case, the constellation combining the terminal devices 2A and 2B becomes a constellation of non-Gray code. Further, in this case, the base station device 1A may allocate power of various ratios to the terminal devices 2A and 2B. For example, the base station device 1A can perform superposition transmission using different constellations for the terminal devices 2A and 2B so that the constellation combining the terminal devices 2A and 2B becomes a constellation of Gray code. Further, in this case, the base station device 1A may allocate power of various ratios to the terminal devices 2A and 2B. For example, the base station device 1A can perform superposition transmission in which the transmission bit sequence destined for the terminal devices 2A and 2B is so mapped as to be a constellation of the existing QPSK/16QAM/64QAM/256QAM. In this case, the base station device 1A can allocate power for the terminal devices 2A and 2B in accordance with the constellation for the mapping.

In a case where the base station device non-orthogonally multiplexes and transmits signals destined for multiple terminal devices, PDSCH1 and PDSCH2 interfere with each other. In this case, since at least the terminal device 2A receives a strong interference signal, the interference signal needs to be handled, removed, or prevented. The abovementioned interference signal is called multi-user interference, inter-user interference, interference due to multi-user transmission, same channel interference, or the like. In order to remove or prevent the interference signal, an interference-signal replica signal obtained from a demodulation or decoding result of the interference signal is subtracted from the reception signal, for example. To remove or prevent the interference signal, Symbol Level Interference Cancellation (SLIC) configured to cancel the interference based on a demodulation result of the interference signal, Codeword Level Interference Cancellation (CWIC) configured to cancel the interference based on a decoding result of the interference signal, Maximum Likelihood Detection (MLD) configured to search for the most likely signal to be transmitted among the transmission signal candidates, Enhanced Minimum Mean Square Error-Interference Rejection Combining (EMMSE-IRC) configured to prevent the interference signal by linear computation, or the like can be used.

The terminal device 2A can receive parameters necessary for removing or preventing the interference signal from the base station device, or can detect the stated parameters through blind detection. It may not be necessary for the terminal device 2B to remove or prevent the interference signal. In a case where the terminal device 2B does not cancel the interference, the terminal device 2B can demodulate a signal destined for the terminal device 2B because of relatively small interference signal power, although the terminal device 2B does not learn the parameters associated with the interference signal. That is, in a case where the base station device 1A non-orthogonally multiplexes the terminal devices 2A and 2B, the terminal device 2A needs to be equipped with a function to remove or prevent the interference signal due to the non-orthogonal multiplexing, but the terminal device 2B does not need to be equipped with a function to cancel or prevent the interference. To rephrase, the base station device 1A can non-orthogonally multiplex a terminal device supporting the non-orthogonal multiplexing and a terminal device not supporting the non-orthogonal multiplexing. In other words, the base station device 1A can non-orthogonally multiplex the terminal devices in which different transmission modes are respectively configured. Accordingly, the communication opportunity of each terminal device can be enhanced.

The base station device 1A transmits, to the terminal device 2A, information (assist information, auxiliary information, control information, configuration information) of the terminal device that interferes (the terminal device 2B in this example). The base station device 1A can transmit information (MUST assist information, MUST information) of the terminal device that interferes, by higher layer signaling or physical layer signaling (control signal, PDCCH, EPDCCH).

The MUST assist information includes part of or all of information of PA, the transmission mode, information of transmit power of the UE-specific Reference Signal, PMI, information of PA of the serving cell, information of transmit power of the UE-specific Deference Signal of the serving cell, the modulation scheme, the Modulation and Coding Scheme (MCS), a Redundancy Version, a Cell (C)-Radio Network Temporary Identifier (RNTI), Semi-Persistent Scheduling (SPS), C-RNTI, and MUST RNTI. PA is information based on a transmit power ratio (power offset) of PDSCH and CRS in an OFDM symbol where CRS is not allocated.

The information of the transmission mode is assist information for the terminal device 2A to learn (detect) the transmission mode of the interference signal, such as the interference signal transmission mode and transmission mode candidates which the base station device 1A can configure (possibly configures).

In each of the parameters included in the MUST assist information, one value (candidate, list) may be configured, or multiple values (candidates, lists) may be configured. In the case of multiple values being configured, the terminal device detects, of the parameters, a parameter configured in the interference signal among the multiple values (that is, blind detection is performed). Part of or all of the parameters included in the above-discussed MUST assist information are transmitted by higher layer signaling. Part of or all of the parameters included in the above-discussed MUST assist information are transmitted by physical layer signaling.

In addition, the MUST assist information may be used in a case that various types of measurement are carried out. The stated measurement includes Radio Resource Management (RRM) measurement and Channel State Information (CSI) measurement.

In a case where the terminal device 2A supports Carrier Aggregation (CA) in which broadband transmission is performed by combining multiple Component Carriers (CCs), the base station device 1A can configure the MUST assist information for a Primary Cell (PCell) and/or a Secondary Cell (SCell). In addition, the base station device 1A can configure or transmit the MUST assist information only for PCell.

The terminal device 2A receives the MUST assist information by the higher layer signaling and/or the physical layer signaling, detects (specifies) parameters for removing or preventing the interference signal based on the MUST assist information, and then remove or prevent the interference signal using the above parameters. Note that the terminal device 2A can detect the parameters not included in the MUST information by blind detection in which it is attempted to detect the parameter candidates in sequence.

The base station device 1A can limit combinations of modulation schemes (or MCS) corresponding to MUST. For example, the base station device 1A can make the modulation scheme of the terminal device 2B equal to or smaller than the modulation scheme of the terminal device 2A. For example, in a case where the modulation scheme of the terminal device 2A is 16QAM, the base station device 1A can make the modulation scheme of the terminal device 2B be 16QAM/QPSK. In such a configuration, in a case that the base station device 1A transmits the modulation scheme of the terminal device 2B to the terminal device 2A, the terminal device 2A can learn the modulation scheme of the terminal device 2B from the modulation scheme of the terminal device 2A itself, reduce the modulation scheme candidates of the terminal device 2B, and the like. Further, in the case where the terminal devices 2A and 2B are multiplexed by MUST, the base station device 1A can make the modulation scheme of the terminal device 2B be fixed to QPSK. In this case, because the base station device 1A need not report the modulation scheme of the terminal device 2B to the terminal device 2A, the amount of control information can be reduced.

The base station device 1A can configure power allocation in accordance with combinations of the modulation schemes of the terminal devices 2A and 2B. For example, the base station device 1A can select, from a list (candidates, sets) of different pieces of power allocation (power ratios, power offsets) associated with the combinations of the modulation schemes of the terminal devices 2A and 2B, power allocation (a power ratio, a power offset) of the terminal devices 2A and 2B. The number of power allocation candidates included in the power allocation list is one or more. For example, the power allocation lists associated with combinations of the respective modulation schemes differ in the number of power ratios included in the power allocation list depending on the combinations. Further, for example, the power allocation lists associated with the combinations of the respective modulation schemes differ in part of or all of the values of power ratios included in the power allocation list in each of the combinations. The base station device 1A can transmit an index of the power allocation list by higher layer signaling or physical layer signaling to the terminal device 2A. The terminal device 2A can specify the power allocation list by the combination of modulation schemes of the terminal device to which MUST is applied (alternatively, by the modulation scheme of the terminal device 2A or the modulation scheme of the terminal device 2B), and learn the power allocation by the index of the power allocation list received from the base station device 1A. The base station device 1A can report power allocation to the terminal device 2A. At this time, the terminal device 2A can learn (specify) the modulation scheme of the terminal device 2B by the power allocation received from the base station device 1A. In the case where the modulation scheme of the terminal device 2B is fixed to, for example, QPSK, the terminal device 2A learns the combination of the modulation schemes in a case that the terminal device 2A learns its modulation scheme. In this case, the base station device 1A can configure power allocation for each modulation scheme, not for a combination of modulation schemes.

In addition, in the case where the modulation scheme of the terminal device 2A is a multilevel modulation scheme or MCS smaller than the modulation scheme of the terminal device 2B, the terminal device 2A can perform demodulation assuming that the transmission is not being carried out by MUST. That is, in this case, the terminal device 2A does not cancel the interference. In a case that MCS included in the downlink control information indicates a certain specific value, for example, indicates the lowest MCS, the terminal device 2A can perform demodulation assuming that the transmission is not being carried out by MUST.

In the case where the terminal devices 2A and 2B are multiplexed by MUST, the base station device 1A can perform the same precoding or different types of precoding on the respective terminal devices. In this case, the base station device 1A can use different power allocation lists between the case of performing the same precoding and the case of performing different precoding on the terminal devices 2A and 2B. For example, part of or all of the values differ between the power allocation list in the case of the same precoding and the power allocation list in the case of the different precoding. For example, ranges of the values differ between the power allocation list in the case of the same precoding and the power allocation list in the case of the different precoding. For example, assume that a combination of power P1 allocated to the terminal device 2A and power allocated to the terminal device 2B is represented as (P1, P2). In a case that the power allocation list of the same precoding is [(0.1, 0.9), (0.2, 0.8), (0.3, 0.7), (0.4, 0.6)], the power allocation list of the different precoding can change value ranges as follows: [(0.05, 0.95), (0.1, 0.9), (0.15, 0.85), (0.2, 0.8)]. Further, in a case that the numbers of power ratios included in the power allocation lists of the same precoding case and the different precoding case are the same, power ratios with different granularity can be configured as indicated in the above numeric value example.

In the case of the different precoding, the base station device 1A can fix the power allocation. For example, the base station device 1A can make the power allocation be (0.5, 0.5). At this time, the terminal device 2A, in a case that it determines that MUST is carried out with different precoding, can perform demodulation using a specific power ratio (e.g., (0.5, 0.5)). The base station device 1A can transmit information indicating whether the same precoding is used or different precoding is used by higher layer signaling or physical layer signaling to the terminal device 2A. The information indicating whether the same precoding is used or different precoding is used can also transmit one bit indicating the same/different precoding, and can transmit as well information indicating a precoding matrix of the interference signal (e.g., PMI), for example. The above-mentioned specific power ratio may be selected in accordance with a combination of precoding types used in the terminal device 2A and the terminal device 2B.

In the case where the terminal devices 2A and 2B are multiplexed by MUST, the base station device 1A can use the same antenna port in the same precoding case, and use different antenna ports and/or different scrambling identities in the different precoding case. At this time, the terminal device 2A can determine whether the same precoding is used by learning (specifying) the antenna port to which the terminal device 2B is allocated by signaling or the like from the base station device 1A. The terminal device 2A can change a reception process depending on whether the same precoding or different precoding is used. For example, the terminal device 2A can perform nonlinear detection such as SLIC, CWIC, or MLD in a case that it is determined that the same precoding is used, and perform linear detection such as EMMSE-IRC in the different precoding case.

The base station device 1A can transmit, to the terminal device 2A, the number of layers, an antenna port number, and a scrambling identity. FIGS. 2, 3, and 4 are each an example of a table indicating antenna ports, scrambling identities, and the number of layers, in which the antenna ports, the scrambling identities, and the number of layers can be indicated by 3-bit values. The base station device 1A can use the table in FIG. 2 in a case of multi-user multiplexing being performed with antenna ports 7/8 and in a case of Single User (SU)-MIMO. The base station device 1A can use the table in FIG. 3 in a case of multi-user multiplexing being performed with antenna ports 7/8/11/13. The base station device 1A can use the table in FIG. 4 in a case of multi-user multiplexing being performed with antenna ports 7/8/11/13 or in a case of SU-MIMO. The base station device 1A can select and use the tables in FIGS. 2, 3, and 4. For example, the base station device 1A can use the table in FIG. 2 in a case of MUST being performed with the antenna ports 7/8. The base station device 1A can use the tables in FIG. 3 and FIG. 4 in a case of MUST being performed with the antenna ports 7/8/11/13. The base station device 1A can use the table illustrated in FIG. 2 in a case of MUST being performed with the same precoding for the terminal devices 2A and 2B. The base station device 1A can use the table illustrated in FIG. 3 or FIG. 4 in a case of MUST being performed with different precoding for the terminal devices 2A and 2B. At this time, the terminal device 2A can change the table to be referred to depending on whether the same precoding or different precoding is used. The base station device 1A, in a case that MUST being performed on the terminal devices 2A and 2B, can indicate, to the terminal device 2A, the antenna ports, the scrambling identities, and the number of layers by the table illustrated in FIG. 3 or FIG. 4, and indicates, to the terminal device 2B, the antenna ports, the scrambling identities, and the number of layers by the table illustrated in FIG. 2. At this time, the base station device 1A may report, only to the terminal device 2A, which of the tables in FIGS. 2, 3, and 4 should be referenced, and may report, to the terminal device 2B, that it should reference only the table illustrated in FIG. 2. The base station device 1A may report, to the terminal device 2A, which of the tables in FIGS. 2, 3, and 4 should be referenced depending on whether the configuration of MUST is made by higher layer signaling, and the report may be related to the configured transmission mode. For example, preparing the configuration of MUST can indicate that parameters associated with MUST such as MUST information, interference information, power ratios, and the like are configured. For example, the terminal device 2A can use the table in FIG. 2 in the case of the configuration of MUST being not configured, while the terminal device 2A can use the table in FIG. 3 or FIG. 4 in the case of the configuration of MUST being configured. The terminal device 2A can switch the table in FIG. 3 or FIG. 4 depending on the configured transmission mode. Further, it can also be related to other information, and the table in FIG. 3 can be used in a case where an MCS index is equal to or greater than a constant value. In addition, by being related to a New Data Indicator (NDI), the Redundancy Version (RV), and the like, the table in FIG. 3 or FIG. 4 can be switched. NDI and RV are included in the downlink control information.

The base station device 1A can configure a mode requesting aperiodic CSI with respect to the terminal device 2A. The terminal device 2A, in accordance with the configured mode, reports CSI to the base station device 1A.

From the base station device 1A, a first mode requesting aperiodic CSI can be configured in the terminal device 2A. The terminal device 2A, in a case that the first mode requesting aperiodic CSI is configured therein from the base station device 1A, reports subband PMI and wideband CQI. The terminal device 2A selects a suited precoding matrix for each subband from a code-book subset assuming the transmission in the stated subband. Wideband CQI is calculated assuming the transmission in the precoding matrix for each selected subband and the system band. The terminal device transmits PMI (subband PMI) selected for each subband. Note that first PMI and second PMI for each subband are reported as subband PMI in a case that eight CSI-RS ports are configured in the transmission modes 9/10, or in a case that a configuration capable of using another code book is given (alternativeCodeBookEnabledFor4TX=TRUE) in a case of 4Tx in the transmission modes 8/9/10. PMI and CQI values are calculated based on the reported RI in the transmission modes 4/8/9/10. In the case of the transmission mode that does not report RI, PMI and CQI are calculated under a condition of rank being one.

From the base station device 1A, a second mode requesting aperiodic CSI can be configured in the terminal device 2A. The terminal device 2A, in a case that the second mode requesting aperiodic CSI is configured therein from the base station device 1A, reports wideband PMI and CQI calculated assuming the usage of wideband PMI and the transmission in the system band, in addition to CSI reported in the first mode. Further, the first mode and the second mode can be configured as the identical mode, and can be distinguished by the base station device 1A reporting (giving a command), to the terminal device 2A, whether to transmit wideband PMI at a higher layer.

From the base station device 1A, a third mode requesting aperiodic CSI can be configured in the terminal device 2A. The terminal device 2A, in a case that the third mode requesting aperiodic CSI is configured therein from the base station device 1A, reports suited PMI/CQI and wideband PMI/CQI in the subbands of M pieces selected by the terminal device 2A. Note that the first PMI and the second PMI assuming the transmission in the system band, and the second PMI for the selected subbands of M pieces are reported, in a case that eight CSI-RS ports are configured in the transmission modes 9/10, or in a case that a configuration capable of using another code book is given (alternativeCodeBookEnabledFor4TX=TRUE) in the case of 4Tx in the transmission modes 8/9/10.

From the base station device 1A, a fourth mode requesting aperiodic CSI can be configured in the terminal device 2A. The terminal device 2A, in a case that the fourth mode requesting aperiodic CSI is configured therein from the base station device 1A, reports the second most suited PMI and/or the second most suited wideband PMI in the subbands of M pieces, in addition to CSI reported in the third mode. The terminal device 2A can further report CQI based on the second most suited PMI and also CQI based on the second most suited wideband PMI in the subbands of a number of M. Note that the terminal device 2A can report, assuming the transmission in the system hand, the first PMI and the second PMI being the second most suited, and the second PMI which is the second most suited in the subbands of M pieces, in a case that eight CSI-RS ports are configured in the transmission modes 9/10, or in a case that a configuration capable of using another code book is given (alternativeCodeBookEnabledFor4TX=TRUE) in the case of 4Tx in the transmission modes 8/9/10. The terminal device 2A, in a case that the fourth mode requesting aperiodic CSI is configured, can increase a subband size in comparison with the case in which the third mode is configured. In other words, the terminal device 2A can calculate and report CSI using a smaller M value in the fourth mode compared to the third mode. In such a configuration, the amount of information necessary to report CSI can be reduced. The terminal device 2A can obtain the second most suited PMI with a different number of subbands from the number of subbands in a case of obtaining the most suited PMI. For example, in a case that the number of subbands in the case of obtaining the most suited PMI is taken as M, the terminal device 2A can obtain the second most suited PMI using a smaller value than M. Further, the third mode and the fourth mode can be configured as the identical mode, and can be distinguished by the base station device 1A reporting (giving a command), to the terminal device 2A, whether to transmit the second most suited PMI at a higher layer.

From the base station device 1A, a fifth mode requesting aperiodic CSI can be configured in the terminal device 2A. The terminal device 2A, in a case that the fifth mode requesting aperiodic CSI is configured therein from the base station device 1A, reports subband CQI, wideband CQI, and wideband PMI. Note that the first PMI and the second PMI corresponding to one precoding matrix selected from a code-book subset assuming the transmission in the system band are reported, in a case that eight CSI-RS ports are configured in the transmission modes 9/10, or in a case that a configuration capable of using another code book is given (alternativeCodeBookEnabledFor4TX=TRUE) in the case of 4Tx in the transmission modes 8/9/10.

From the base station device 1A, a sixth mode requesting aperiodic CSI can be configured in the terminal device 2A. The terminal device 2A, in a case that the sixth mode requesting aperiodic CSI is configured therein from the base station device 1A, can report the second most suited wideband PMI and CQI based on the second most suited wideband PMI, in addition to CSI reported in the fifth mode. Further, the fifth mode and the sixth mode can be configured as the identical mode, and can be distinguished by the base station device 1A reporting (giving a command), to the terminal device 2A, whether to transmit the second most suited PMI at a higher layer.

From the base station device 1A, a seventh mode requesting aperiodic CSI can be configured in the terminal device 2A. The terminal device 2A, in a case that the seventh mode requesting aperiodic CSI is configured therein from the base station device 1A, reports wideband CQI, subband CQI, and subband PMI. Note that the terminal device 2A reports the first PMI of wideband and the second PMI of subband as PMI, in a case that eight CSI-RS ports are configured in the transmission modes 9/10, or in a case that a configuration capable of using another code book is given (alternativeCodeBookEnabledFor4TX=TRUE) in the case of 4Tx in the transmission modes 8/9/10.

From the base station device 1A, an eighth mode requesting aperiodic CSI can be configured in the terminal device 2A. The terminal device 2A, in a case that the eighth mode requesting aperiodic CSI is configured therein from the base station device 1A, can report the second most suited PMI in each subband and wideband CQI based on the second most suited PMI in each subband and/or subband CQI, in addition to CSI reported in the seventh mode. Note that the first PMI of wideband which is the second most suited and the second PMI of subband which is the second most suited are reported, in a case that eight CSI-RS ports are configured in the transmission modes 9/10, or in a case that a configuration capable of using another code book is given (alternativeCodeBookEnabledFor4TX=TRUE) in the case of 4Tx in the transmission modes 8/9/10. The terminal device 2A, in a case that the eighth mode requesting aperiodic CSI is configured therein from the base station device 1A, can increase the subband size and decrease the number of subbands in comparison with the seventh mode. In such a configuration, the amount of information necessary to report CSI can be reduced. Further, the seventh mode and the eighth mode can be configured as the identical mode, and can be distinguished by the base station device 1A reporting (giving a command), to the terminal device 2A, whether to transmit the second most suited PMI at a higher layer.

The base station device 1A can configure a mode requesting periodic CSI with respect to the terminal device 2A. In the case of the mode requesting periodic CSI, the terminal device 2A periodically reports RI and/or wideband CQI/PMI and/or subband CQI/PMI. A reporting period becomes longer in the order of RI, wideband CQI/PMI, and subband CQI/PMI. The terminal device 2A, in accordance with the configured CSI mode, periodically reports CSI to the base station device 1A. The terminal device 2A can periodically report, in addition to the above, the second most suited wideband CQI/PMI and the second most suited subband CQI/PMI. The terminal device 2A can report the second most suited CQI/PMI after having reported the most suited CQI/PMI. The terminal device 2A can change the reporting period of the most suited CQI/PMI and the reporting period of the second most suited CQI/PMI. For example, the terminal device 2A can report the second most suited CQI/PMI at a longer reporting period than that of the most suited CQI/PMI.

From the base station device 1A, the first mode periodically requesting CSI can be configured in the terminal device 2A. The terminal device 2A, in accordance with the first mode configured from the base station device 1A and requesting periodic CSI, periodically reports CSI. The terminal device 2A reports one RI in the subframe reporting RI. In the subframe where RI and the first PMI are reported, the terminal device 2A reports RI in the form of joint coding and the first PMI. In the subframe where CQI/PMI are reported, the terminal device 2A reports wideband CQI and wideband PMI. In a case where RI>1 is satisfied, the terminal device 2A additionally reports CQI of 3-bit wideband spatial difference.

In the subframe where wideband CQI and the second PMI are reported, the terminal device 2A reports wideband CQI and the second PMI of wideband. In a case where RI>1 is satisfied, the terminal device 2A additionally reports CQI of 3-bit wideband spatial difference. In the subframe where wideband CQI, the first PMI, and the second PMI are reported, the terminal device 2A reports wideband CQI, the first PMI of wideband, and the second PMI of wideband. In a case where RI>1 is satisfied, the terminal device 2A additionally reports CQI of 3-bit wideband spatial difference.

From the base station device 1A, the second mode periodically requesting CSI can be configured in the terminal device 2A. The terminal device 2A, in accordance with the second mode configured from the base station device 1A and requesting periodic CSI, can periodically report CSI. The terminal device 2A reports one RI in the subframe reporting RI. In the subframe where RI and the first PMI are reported, the terminal device 2A reports RI in the form of joint coding and the first PMI. In the subframe where CQI/PMI are reported, the terminal device 2A reports wideband CQI and wideband PMI. In a case where RI>1 is satisfied, the terminal device 2A additionally reports CQI of 3-bit wideband spatial difference. In the subframe where wideband CQI and the second PMI are reported, the terminal device 2A reports wideband CQI and the second PMI of wideband. In a case where RI>1 is satisfied, the terminal device 2A additionally reports CQI of 3-bit wideband spatial difference. In the subframe where wideband CQI, the first PMI, and the second PMI are reported, the terminal device 2A reports wideband CQI, the first PMI of wideband, and the second PMI of wideband. In a case where RI>1 is satisfied, the terminal device 2A additionally reports CQI of 3-bit wideband spatial difference. In the subframe where RI and the first PMI which is the second most suited are reported, the terminal device 2A reports RI in the form of joint coding and the first PMI which is the second most suited. In the subframe where CQI/the second most suited PMI are reported, the terminal device 2A reports the second most suited wideband PMI and CQI calculated based on the second most suited wideband precoding matrix. In a case where RI>1 is satisfied, the terminal device 2A additionally reports CQI of 3-bit wideband spatial difference. In the subframe where wideband CQI and the second PMI which is the second most suited are reported, the terminal device 2A reports the second PMI of wideband which is the second most suited, and wideband CQI based on the second PMI of wideband which is the second most suited and the first PMI having been lately reported. In a case where RI>1 is satisfied, the terminal device 2A additionally reports CQI of 3-bit wideband spatial difference.

From the base station device 1A, the third mode periodically requesting CSI can be configured in the terminal device 2A. The terminal device 2A, in accordance with the third mode configured from the base station device 1A and requesting periodic CSI, can periodically report CSI. The terminal device 2A reports one RI, or one RI and PTI in the subframe reporting RI. In the subframe where wideband CQI/PMI are reported, wideband CQI and wideband PMI are reported. In a case where RI>1 is satisfied, the terminal device 2A additionally reports CQI of 3-bit wideband spatial difference. In the subframe where the first PMI of wideband is reported, the terminal device 2A successively reports the first PMI of wideband. In the subframe where wideband CQI/the second PMI are reported, the terminal device 2A reports wideband CQI and the second PMI of wideband. In a case where RI>1 is satisfied, the terminal device 2A additionally reports CQI of 3-bit wideband spatial difference. In the subframe where CQI with respect to a selected subband is reported, subband CQI for each bandwidth part is successively reported. In a case where RI>1 is satisfied, the terminal device 2A additionally reports CQI of 3-bit wideband spatial difference. In the subframe where subband CQI/the second PMI with respect to a selected subband are reported, subband CQI for each bandwidth part and the second of subband are successively reported. In a case where RI>1 is satisfied, the terminal device 2A additionally reports CQI of 3-bit wideband spatial difference.

From the base station device 1A, the fourth mode periodically requesting CSI can be configured in the terminal device 2A. The terminal device 2A, in accordance with the fourth mode configured from the base station device 1A and requesting periodic CSI, can periodically report CSI. The terminal device 2A reports one RI, or one RI and PTI in the subframe reporting RI. In the subframe where wideband CQI/PMI are reported, wideband CQI and wideband PMI are reported. In a case where RI>1 is satisfied, the terminal device 2A additionally reports CQI of 3-bit wideband spatial difference. In the subframe where the first PMI of wideband is reported, the terminal device 2A successively reports the first PMI of wideband. In the subframe where wideband CQI/the second PMI are reported, the terminal device 2A reports wideband CQI and the second PMI of wideband. In a case where RI>1 is satisfied, the terminal device 2A additionally reports CQI of 3-bit wideband spatial difference. In the subframe where CQI with respect to a selected subband is reported, subband CQI for each bandwidth part is successively reported. In a case where RI>1 is satisfied, the terminal device 2A additionally reports CQI of 3-bit wideband spatial difference. In the subframe where subband CQI/the second PMI with respect to a selected subband are reported, subband CQI for each bandwidth part and the second PMI of subband are successively reported. In a case where RI>1 is satisfied, the terminal device 2A additionally reports CQI of 3-bit wideband spatial difference. In the subframe where wideband CQI/the second most suited PMI are reported, reported are the second most suited wideband. PMI and wideband CQI based on the second most suited wideband PMI. In a case where RI>1 is satisfied, the terminal device 2A additionally reports CQI of 3-bit wideband spatial difference. In the subframe where the first PMI of wideband which is the second most suited is reported, the terminal device 2A reports the first PMI of wideband which is the second most suited. In the subframe where wideband CQI/the second PMI which is the second most suited are reported, the terminal device 2A reports the second PMI which is the second most suited, and wideband CQI calculated based on the second PMI which is the second most suited and the first PMI which is the second most suited and has been lately reported. In the subframe where subband CQI/the second PMI which is the second most suited are reported, reported are the second PMI of subband which is the second most suited, and subband CQI calculated based on the second PMI of subband which is the second most suited and the first PMI which is the second most suited and has been lately reported. In a case where RI>1 is satisfied, the terminal device 2A additionally reports CQI of 3-bit wideband spatial difference.

In a case that a report including the second most suited PMI/the first PMI/the second PMI collides with a report not including the second most suited PMI/the first PMI/the second PMI, the terminal device 2A can perform reporting while prioritizing the report not including the second most suited PMI/the first PMI/the second PMI.

The base station device 1A can transmit, to the terminal device 2A, information indicating whether to request a report of the second most suited PMI. At this time, the terminal device 2A, in a case that it determines that the information indicating a request for the report of the second most suited PMI has been received from the base station device 1A, can report CSI containing the second most suited PMI. Further, the terminal device 2A, in a case that it is determined from the received control information that the base station device 1A requests a report of the second most suited PMI, can report the second most suited PMI in an aperiodic CSI report. The base station device 1A can configure information indicating whether to request a report of the second most suited PMI for each CC. At this time, the terminal device 2A can report the second most suited PMI for each CC in accordance with the received control information. The base station device 1A can make the information indicating whether to request a report of the second most suited PMI be a configuration common to multiple CCs. At this time, the terminal device 2A can report the second most suited PMI to the multiple CCs in accordance with control information received at a certain CC.

The base station device 1A, in a case that performing transmission on the terminal devices 2A and 2B by MUST, can reduce a pattern of MCS allocated to the terminal device 2A. The MCS pattern can decimate the MCS index at an equal interval, can make it similar to a CQI table used for the CQI report by the terminal device, and can delete part of or all of MCS corresponding to, for example, 64QAM/256QAM with a large MCS index. The base station device 1A can transmit, to the terminal device 2A, information in which the number of bits of pattern-reduced MCS is decreased. For example, the number of bits of MCS can be decreased from five bits to four bits. The base station device 1A can add information, to the pattern-reduced MCS, which is different from MCS of the base station device 1A itself. For example, information to be added includes a power ratio of the terminal device 2A and the terminal device 2B, PMI of the terminal device 2B, MCS of the terminal device 2B, and part of or all of the modulation scheme of the terminal device 2B. In the case where the number of bits of MCS is decreased by one, the decreased one bit can be taken as information indicating the power ratio of the terminal devices 2A and 2B, for example. At this time, the terminal device 2A can learn MCS of the terminal device 2A itself and the power ratio from 5-bit MCS having been received from the base station device 1A. With this, the base station device 1A can transmit new information without increasing the number of bits.

Figure 5:
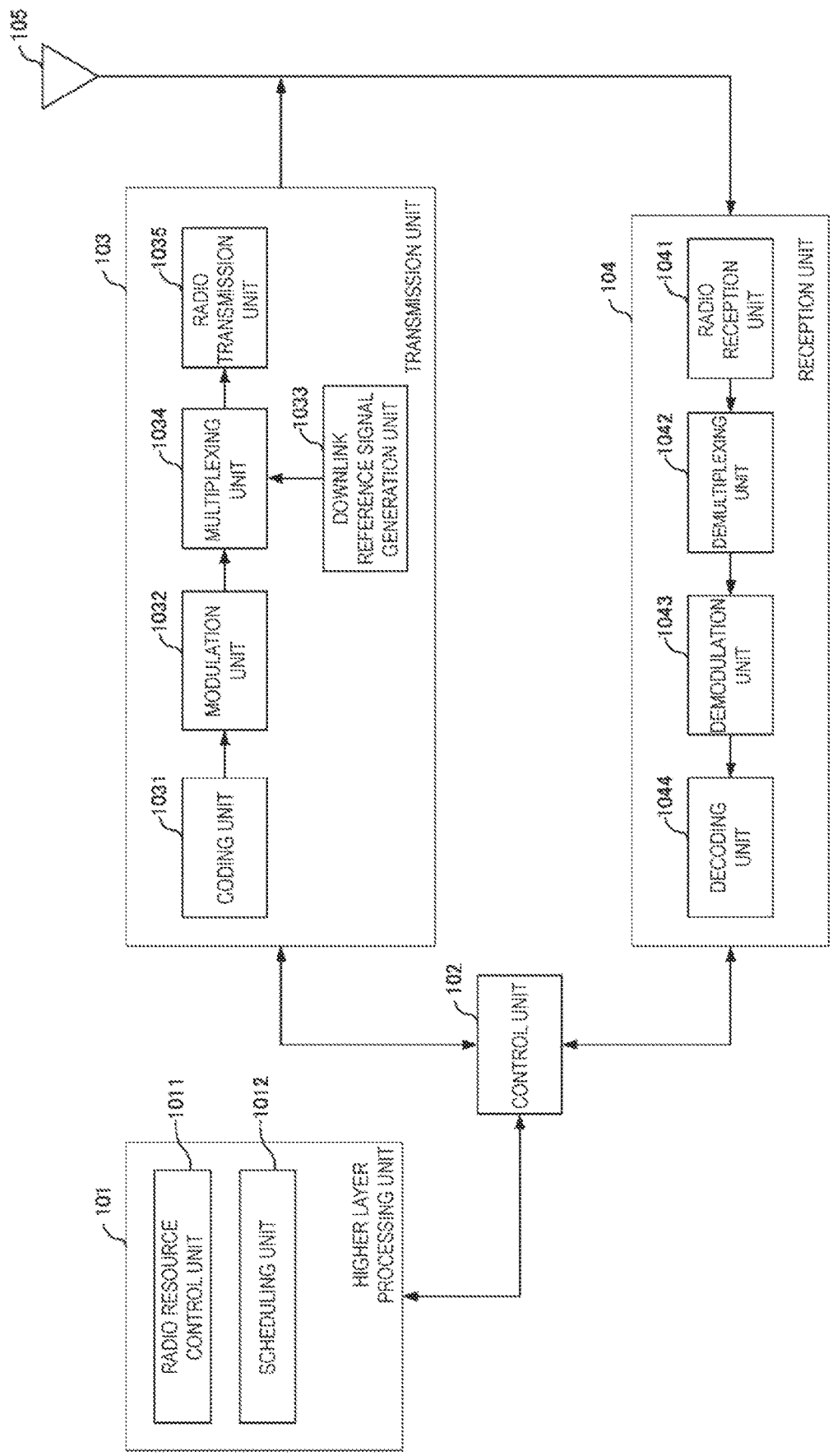
FIG. 5 is a block diagram illustrating a configuration example of a base station device according to the present embodiment.

FIG. 5 is a schematic block diagram illustrating a configuration of the base station device 1A according to the present embodiment. As illustrated in FIG. 5, the base station device 1A is configured, including a higher layer processing unit (higher layer processing step) 101, a control unit (controlling step) 102, a transmission unit (transmitting step) 103, a reception unit (receiving step) 104, and a transmit and/or receive antenna 105. The higher layer processing unit 101 is configured, including a radio resource control unit (radio resource controlling step) 1011 and a scheduling unit (scheduling step) 1012. The transmission unit 103 is configured, including a coding unit (coding step) 1031, a modulation unit (modulating step) 1032, a downlink reference signal generation unit (downlink reference signal generating step) 1033, a multiplexing unit (multiplexing step) 1034, and a radio transmission unit (radio transmitting step) 1035. The reception unit 104 is configured, including a radio reception unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data. Convergence Protocol (PDCP) layer, the Radio Link Control (RLC) layer, and the Radio Resource Control (RRC) layer. Furthermore, the higher layer processing unit 101 generates information necessary for control of the transmission unit 103 and the reception unit 104, and outputs the generated information to the control unit 102.

The higher layer processing unit 101 receives information of a terminal device, such as UE capability or the like, from the terminal device. To rephrase, the terminal device transmits its function to the base station device by higher layer signaling.

Note that in the following description, information of a terminal device includes information indicating whether the stated terminal device supports a prescribed function, or information indicating that the stated terminal device has completed the introduction and test of a prescribed function. In the following description, information of whether the prescribed function is supported includes information of whether the introduction and test of the prescribed function have been completed.

For example, in a case where a terminal device supports a prescribed function, the stated terminal device transmits information (parameters) indicating whether the prescribed function is supported. In a case where a terminal device does not support a prescribed function, the stated terminal device does not transmit information (parameters) indicating whether the prescribed function is supported. In other words, whether the prescribed function is supported is reported by whether information (parameters) indicating whether the prescribed function is supported is transmitted. Information (parameters) indicating whether a prescribed function is supported may be reported using one bit of 1 or 0.

For example, in a case where multiple functions corresponding to MUST are present, the terminal device can transmit information indicating whether the functions are supported on a function-by-function basis. For example, functions corresponding to MUST are part of or all of capability to remove or prevent multi-user interference (PDSCH interference), capability to correspond to multiple tables indicating antenna ports, scrambling identities and the number of layers, capability to correspond to a prescribed number of antenna ports, capability to correspond to the number of CCs of Carrier Aggregation, the number of resource blocks and the like, and capability to correspond to a prescribed transmission mode.

The radio resource control unit 1011 generates, or acquires from a higher node, the downlink data (the transport block) arranged in the downlink PDSCH, system information, the RRC message, the MAC Control Element (CE), and the like. The radio resource control unit 1011 outputs the downlink data to the transmission unit 103, and outputs other information to the control unit 102. Furthermore, the radio resource control unit 1011 manages various configuration information of the terminal devices.

The scheduling unit 1012 determines a frequency and a subframe to which the physical channels (PDSCH and PDSCH) are allocated, the coding rate and modulation scheme (or MCS) for the physical channels (PDSCH and PDSCH), the transmit power, and the like. The scheduling unit 1012 outputs the determined information to the control unit 102.

The scheduling unit 1012 generates the information to be used for the scheduling of the physical channels (PDSCH and PUSCH), based on the result of the scheduling. The scheduling unit 1012 outputs the generated information to the control unit 102.

Based on the information input from the higher layer processing unit 101, the control unit 102 generates a control signal for controlling of the transmission unit 103 and the reception unit 104. The control unit 102 generates the downlink control information based on the information input from the higher layer processing unit 101, and outputs the generated information to the transmission unit 103.

The transmission unit 103 generates the downlink reference signal in accordance with the control signal input from the control unit 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal device 2 through the transmit and/or receive antenna 105.

The coding unit 1031 codes the HARQ indicator, the downlink control information, and the downlink data that are input from the higher layer processing unit 101, in compliance with the coding scheme prescribed in advance, such as block coding, convolutional coding, or turbo coding, or in compliance with the coding scheme determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence that is already learned to the terminal device 2A and that is acquired in accordance with a rule prescribed in advance based on the physical cell identity PCI, cell ID) for identifying the base station device 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmission unit 1035 performs Inverse Fast Fourier Transform (IFFT) on the modulation symbol resulting from the multiplexing or the like, generates an OFDM symbol, attaches a Cyclic Prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the control unit 102, the reception unit 104 demultiplexes, demodulates, and decodes the reception signal received from the terminal device 2A through the transmit and/or receive antenna 105, and outputs information resulting from the decoding to the higher layer processing unit 101.

The radio reception unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 1041 removes a portion corresponding to CP from the digital signal resulting from the conversion. The radio reception unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio reception unit 1041 into PUCCH, PUSCH, and the signal such as the uplink reference signal. The demultiplexing is performed based on radio resource allocation information that is determined in advance by the base station device 1A using the radio resource control unit 1011 and that is included in the uplink grant notified to each of the terminal devices 2.

Furthermore, the demultiplexing unit 1042 makes a compensation of channels including PUCCH and PUSCH. The demultiplexing unit 1042 demultiplexes the uplink reference signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the modulation scheme prescribed in advance, such as BPSK, QPSK, 16QAM, 64QAM, 256QAM, or the like, or in compliance with the modulation scheme that the base station device 1A itself notified in advance, with the uplink grant, each of the terminal devices 2.

The decoding unit 1044 decodes the coded bits of PUCCH and PUSCH, which have been demodulated, at the coding rate in compliance with a coding scheme prescribed in advance, the coding rate being prescribed in advance or being notified in advance with the uplink grant to the terminal device 2 by the base station device 1A itself, and outputs the decoded uplink data and uplink control information to the higher layer processing unit 101. In a case where PUSCH is re-transmitted, the decoding unit 1044 performs the decoding with the coded bits input from the higher layer processing unit 101 and retained in an HARQ buffer, and the demodulated coded bits.

Figure 6:
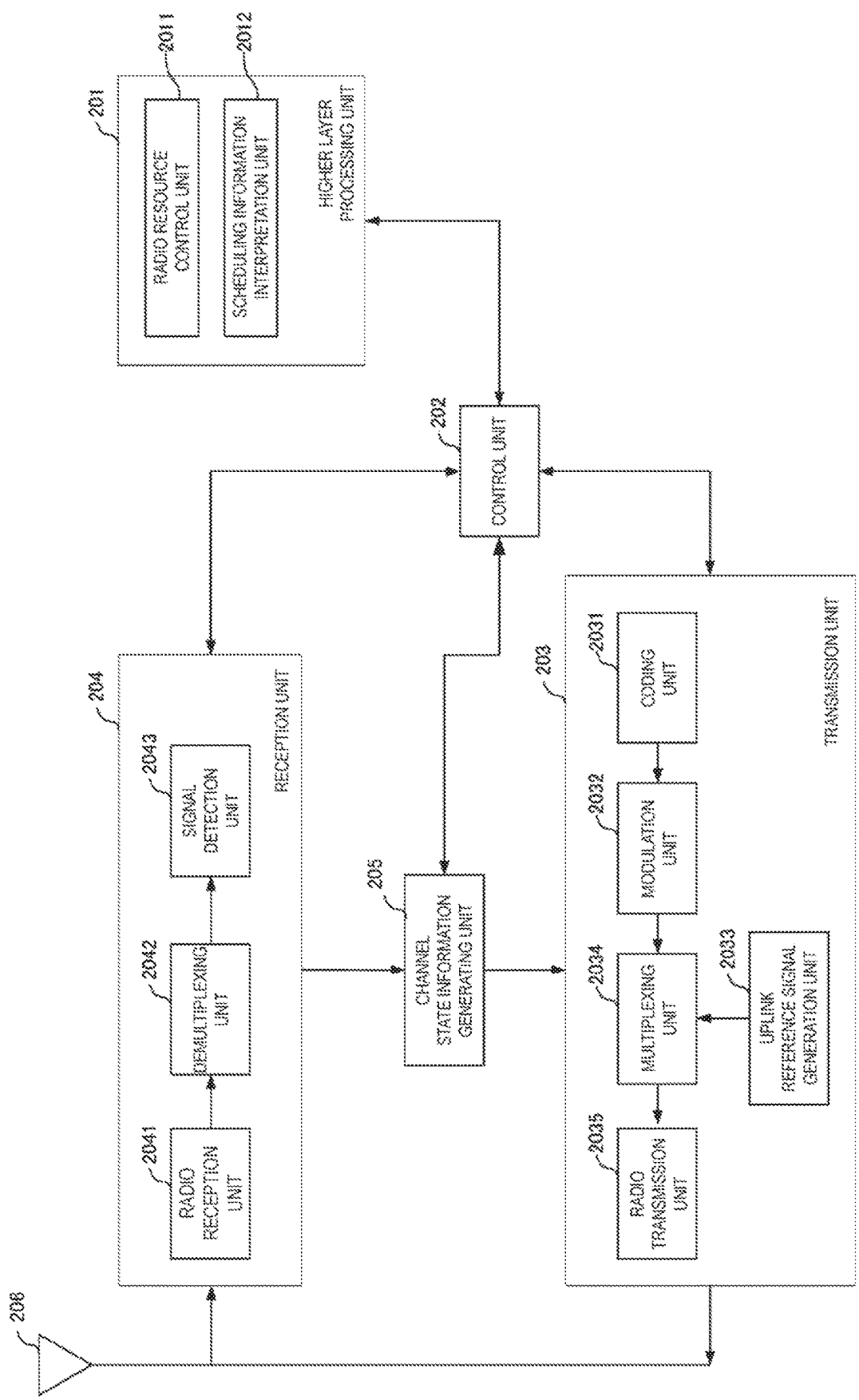
FIG. 6 is a block diagram illustrating a configuration example of a terminal device according to the present embodiment.

FIG. 6 is a schematic block diagram illustrating a configuration of the terminal device 2 according to the present embodiment. As illustrated in FIG. 6, the terminal device 2A is configured, including a higher layer processing unit (higher layer processing step) 201, a control unit (controlling step) 202, a transmission unit (transmitting step) 203, a reception unit (receiving step) 204, a channel state information generating unit (channel state information generating step) 205, and a transmit and/or receive antenna 206. The higher layer processing unit 201 is configured, including a radio resource control unit (radio resource controlling stop) 2011 and a scheduling information interpretation unit (scheduling information interpreting step) 2012. The transmission unit 203 is configured, including a coding unit (coding step) 2031, a modulation unit (modulating step) 2032, an uplink reference signal generation unit (uplink reference signal generating step) 2033, a multiplexing unit (multiplexing step) 2034, and a radio transmission unit (radio transmitting step) 2035. The reception unit 204 is configured, including a radio reception unit (radio receiving step) 2041, a demultiplexing unit (demultiplexing step) 2042, and a signal detection unit (signal detecting step) 2043.

The higher layer processing unit 201 outputs the uplink data (the transport block) generated by a user operation or the like, to the transmission unit 203. The higher layer processing unit 201 performs processing of the Medium Access Control (MAC) layer, the Packet Data. Convergence Protocol (PDCP) layer, the Radio Link Control (RLC) layer, and the Radio Resource Control (RRC) layer.

The higher layer processing unit 201 outputs, to the transmission unit 203, information indicating a terminal device function supported by the terminal device 2A itself.

Furthermore, the radio resource control unit 2011 manages various configuration information of the terminal devices 2A itself. Furthermore, the radio resource control unit 2011 generates information to be mapped to each uplink channel, and outputs the generated information to the transmission unit 203.

The radio resource control unit 2011 acquires configuration information of CSI feedback transmitted from the base station device, and outputs the acquired information to the control unit 202.

The scheduling information interpretation unit 2012 interprets the downlink control information received through the reception unit 204, and determines scheduling information. The scheduling information interpretation unit 2012 generates the control information in order to control the reception unit 204 and the transmission unit 203 in accordance with the scheduling information, and outputs the generated information to the control unit 202.

On the basis of the information input from the higher layer processing unit 201, the control unit 202 generates a control signal for controlling the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit CSI generated by the channel state information generating unit 205 to the base station device.

In accordance with the control signal input from the control unit 202, the reception unit 204 demultiplexes, demodulates, and decodes a reception signal received from the base station device 1A through the transmit and/or receive antenna 206, and outputs the resulting information to the higher layer processing unit 201.

The radio reception unit 2041 converts, by down-converting, a downlink signal received through the transmit and/or receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 2041 removes a portion corresponding to CP from the digital signal resulting from the conversion, performs fast Fourier transform on the signal from which CP has been removed, and extracts a signal in the frequency domain.

The demultiplexing unit 2042 demultiplexes the extracted signal into PHICH, PDCCH, EPDCCH, PDSCH, and the downlink reference signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the control unit 202. The control unit 202 outputs PDSCH and the channel estimation value of the desired signal to the signal detection unit 2043.

The signal detection unit 2043, using PDSCH and the channel estimation value, detects a signal, and outputs the detected signal to the higher layer processing unit 201.

The transmission unit 203 generates the uplink reference signal in accordance with the control signal input from the control unit 202, codes and modulates the uplink data (the transport block) input from the higher layer processing unit 201, multiplexes PUCCH, PUSCH, and the generated uplink reference signal, and transmits a result of the multiplexing to the base station device 1A through the transmit and/or receive antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a modulation scheme prescribed in advance for each channel.

The uplink reference signal generation unit 2033 generates a sequence acquired according to a rule (formula) prescribed in advance, based on a physical cell identity (PCI, also referred to as a cell ID or the like) for identifying the base station device 1A, a bandwidth to which the uplink reference signal is mapped, a cyclic shift notified with the uplink grant, a parameter value for generation of a DMRS sequence, and the like.

In accordance with the control signal input from the control unit 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to the resource elements for each transmit antenna port.

The radio transmission unit 2035 performs Inverse Fast Fourier Transform (IFFT) on a signal resulting from the multiplexing, performs the modulation of SC-FDMA scheme, generates an SC-FDMA symbol, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

A program running on each of the base station device and the terminal device according to an aspect of the present invention is a program (a program for causing a computer to operate) that controls a CPU and the like in such a manner as to realize the functions according to an aspect of the above-described embodiments of the present invention. The information handled by these devices is temporarily held in a RAM at the time of processing, and is then stored in various types of ROMs, HDDs, and the like, and read out by the CPU as necessary to be edited and written. Here, a semiconductor medium (a ROM, a non-volatile memory card, or the like, for example), an optical recording medium (DVD, MO, MD, CD, BD, or the like, for example), a magnetic recording medium (a magnetic tape, a flexible disk, or the like, for example), and the like can be given as examples of recording media for storing the programs. In addition to realizing the functions of the above-described embodiments by performing loaded programs, functions according to an aspect of the present invention can be realized by the programs running cooperatively with an operating system, other application programs, or the like in accordance with instructions included in those programs.

In a case that delivering these programs to market, the programs can be stored in a portable recording medium, or transferred to a server computer connected via a network such as the Internet. In this case, storage devices in the server computer are also included in an aspect of the present invention. Furthermore, some or all portions of each of the terminal device and the base station device in the above-described embodiments may be realized as LSI, which is a typical integrated circuit. The functional blocks of the reception device may be individually realized as chips, or may be partially or completely integrated into a chip. In a case that the functional blocks are integrated into a chip, an integrated circuit control unit for controlling them is added.

The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, it is also possible to use an integrated circuit based on the technology.

It is to be noted that the invention of the present patent application is not limited to the above-described embodiments. The terminal device according to the invention of the present patent application is not limited to the application in the mobile station device, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiments of the invention have been described in detail thus far with reference to the drawings, but the specific configuration is not limited to the embodiments. Other designs and the like that do not depart from the essential spirit of the invention also fall within the scope of the claims.

INDUSTRIAL APPLICABILITY

The present invention can be preferably used in a base station device, a terminal device, and a communication method.

The present international application claims priority based on JP 2015-187658 filed on Sep. 25, 2015, and all the contents of JP 2015-187658 are incorporated in the present international application by reference.

DESCRIPTION OF REFERENCE NUMERALS

1A Base station device
2A, 2B Terminal device
101 Higher layer processing unit
102 Control unit
103 Transmission unit
104 Reception unit
105 Transmit and/or receive antenna
1011 Radio resource control unit
1012 Scheduling unit
1031 Coding unit
1032 Modulation unit
1033 Downlink reference signal generation unit
1034 Multiplexing unit
1035 Radio transmission unit
1041 Radio reception unit
1042 Demultiplexing unit
1043 Demodulation unit
1044 Decoding unit
201 Higher layer processing unit
202 Control unit
203 Transmission unit
204 Reception unit
205 Channel state information generating unit
206 Transmit and/or receive antenna
2011 Radio resource control unit
2012 Scheduling information interpretation unit
2031 Coding unit
2032 Modulation unit
2033 Uplink reference signal generation unit
2034 Multiplexing unit
2035 Radio transmission unit
2041 Radio reception unit
2042 Demultiplexing unit
2043 Signal detection unit

The invention claimed is:

1. A base station device configured to communicate with a terminal device, the base station device comprising:
radio resource control (RRC) processing circuitry configured to configure RRC information related to Multiuser Superposition Transmission (MUST), and
transmission circuitry configured to transmit, to the terminal device, downlink control information (DCI) through a physical downlink control channel (PDCCH) and transmit, to the terminal device, first downlink data through a first physical downlink shared channel (PDSCH), wherein
in a case that the transmission circuitry is configured to transmit the DCI in a first transmission mode, the DCI includes first information indicating a modulation scheme, and an index indicating one of a plurality of power ratios,
the plurality of power ratios being different according to the modulation scheme, and
the transmission circuitry is configured to transmit the first downlink data through the first PDSCH by using the one of the plurality of power ratios determined by the index and the modulation scheme, and
in a case that the transmission circuitry is configured to transmit the DCI in a second transmission mode, the DCI includes the first information and second information indicating antenna port, scrambling identity, and number of layers without including the index and the transmission circuitry is configured to transmit the first downlink data through the first PDSCH by using at least one antenna port out of antenna ports 7 and 8 based on the second information.

2. The base station device according to claim 1, wherein the transmission circuitry is configured to transmit the first downlink data through the first PDSCH by using the first information indicating the modulation scheme and a modulation mapping in which a modulation of quadrature phase shift keying is superposed.

3. The base station device according to claim 1, wherein
the RRC processing circuitry is configured to configure the MUST in a primary cell or a secondary cell, and
the primary cell and the secondary cell are used for carrier aggregation.

4. The base station device according to claim 1, wherein
the transmission circuitry is configured to transmit, to a plurality of terminal devices, the first downlink data through the first PDSCH and second downlink data through one or more second PDSCHs other than the first PDSCH in a same resource in time, and in a same resource in frequency, with a same precoding.

5. A terminal device configured to communicate with a base station device, the terminal device comprising:
radio resource control (RRC) processing circuitry configured with RRC information related to Multiuser Superposition Transmission (MUST), and
reception circuitry configured to receive, from the base station device, downlink control information (DCI) through a physical downlink control channel (PDCCH) and receive, from the base station device, first downlink data through a first physical downlink shared channel (PDSCH), wherein
in a case that the reception circuitry is configured to receive the DCI in a first transmission mode, the DCI includes first information indicating a modulation scheme, and an index indicating one of a plurality of power ratios,
the plurality of power ratios being different according to the modulation scheme,
the reception circuitry is configured to receive the first downlink data through the first PDSCH by using the one of the plurality of power ratios determined by the index and the modulation scheme, and
in a case that the reception circuitry is configured to receive the DCI in a second transmission mode, the DCI includes the first information and second information indicating antenna port, scrambling identity, and number of layers without including the index and the reception circuitry is configured to receive the first downlink data through the first PDSCH by using at least one antenna port out of antenna ports 7 and 8 based on the second information.

6. The terminal device according to claim 5, wherein
the reception circuitry is configured to receive the first downlink data through the first PDSCH by using the first information indicating the modulation scheme and a modulation mapping in which a modulation of quadrature phase shift keying is superposed.

7. The terminal device according to claim 5, wherein
the RRC processing circuitry is configured with the MUST in a primary cell or a secondary cell, and
the primary cell and the secondary cell are used for carrier aggregation.

8. The terminal device according to claim 5, wherein
the reception circuitry is configured to receive, from the base station device, the first downlink data through the first PDSCH and second downlink data through one or more second PDSCHs other than the first PDSCH in a same resource in time, and in a same resource in frequency, with a same precoding.

9. A communication method for a base station device, the communication method comprising steps of:
configuring radio resource control (RRC) information related to Multiuser Superposition Transmission (MUST), and
transmitting, to a terminal device, downlink control information (DCI) through a physical downlink control channel (PDCCH) and transmitting, to the terminal device, downlink data through a physical downlink shared channel (PDSCH), wherein
in a case that the DCI is transmitted in a first transmission mode, the DCI includes information indicating a modulation scheme, and an index indicating one of a plurality of power ratios,
the plurality of power ratios being different according to the modulation scheme, further comprising a step of
transmitting the downlink data through the PDSCH by using the one of the plurality of power ratios determined by the index and the modulation scheme, and
in a case that the DCI is transmitted in a second transmission mode, the DCI includes the first information and second information indicating antenna port, scrambling identity, and number of layers without including the index and the first downlink data is transmitted through the first PDSCH by using at least one antenna port out of antenna ports 7 and 8 based on the second information.

10. A communication method for a terminal device, the communication method comprising steps of:
being configured with radio resource control (RRC) information related to Multiuser Superposition Transmission (MUST), and
receiving, from a base station device, downlink control information (DCI) through a physical downlink control channel (PDCCH) and receiving, from the base station device, downlink data through a physical downlink shared channel (PDSCH), wherein
in a case that the DCI is received in a first transmission mode, the DCI includes information indicating a modulation scheme, and an index indicating one of a plurality of power ratios, the plurality of power ratios being different according to the modulation scheme, further comprising a step of
receiving the downlink data through the PDSCH by using the one of the plurality of power ratios determined by the index and the modulation scheme, and
in a case that the DCI is received in a second transmission mode, the DCI includes the first information and second information indicating antenna port, scrambling identity, and number of layers without including the index and the first downlink data is received through the first PDSCH by using at least one antenna port out of antenna ports 7 and 8 based on the second information.

* * * * *